Figure 1:
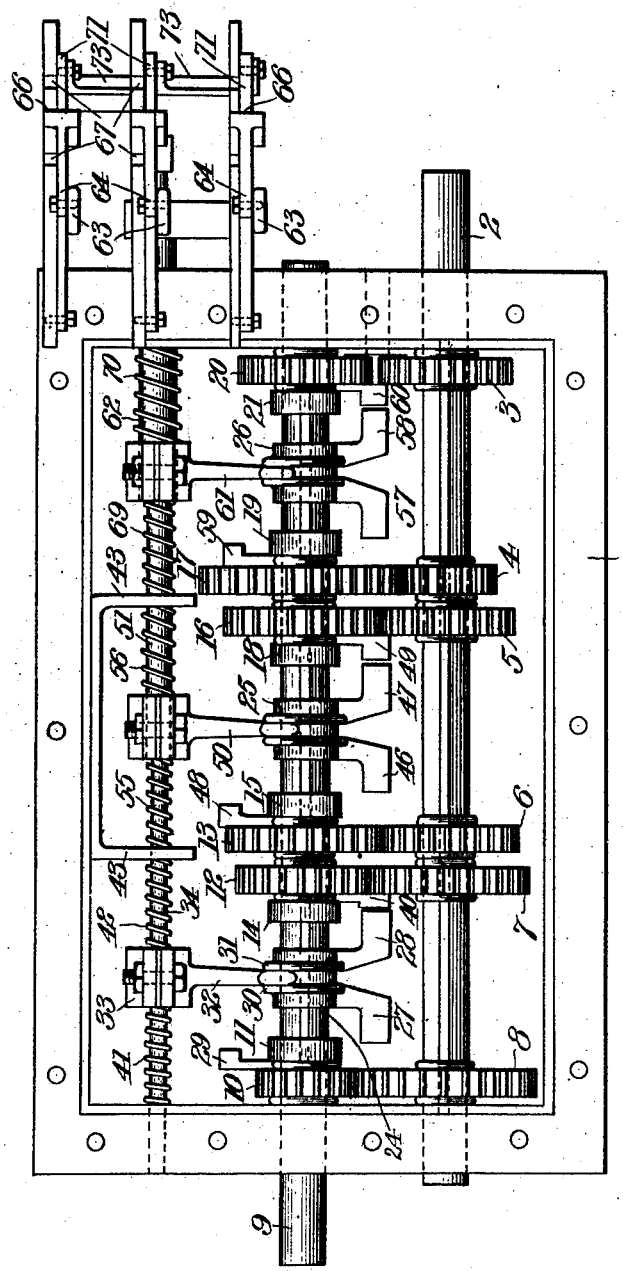

F. B. ALLEN.
TRANSMISSION GEAR.
APPLICATION FILED JAN. 13, 1909.

972,144.

Patented Oct. 11, 1910.
2 SHEETS—SHEET 1.

Witnesses
C. N. Walker
Albert Popkins

Inventor
Frank B. Allen
By Sturtevant & Mason
Attorneys

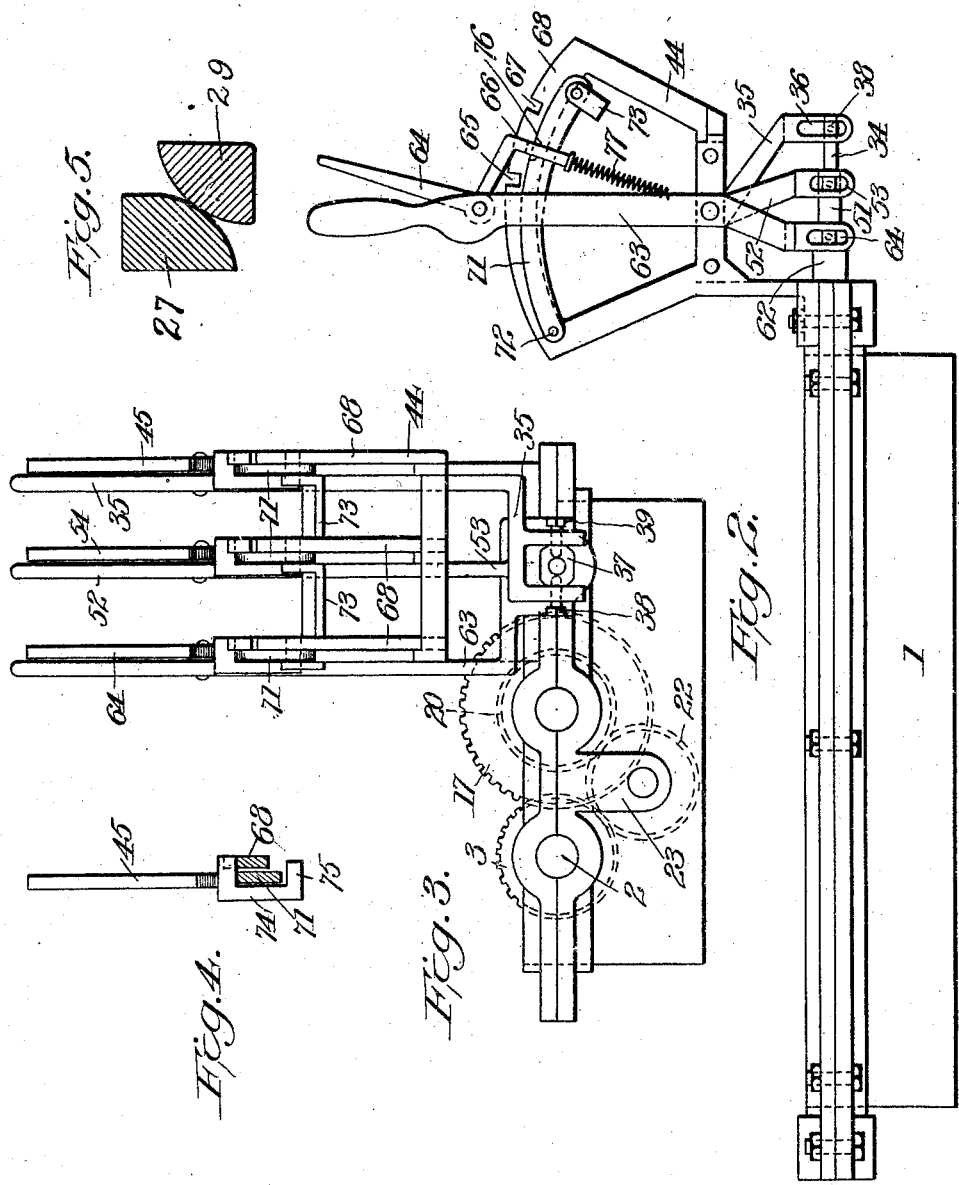

UNITED STATES PATENT OFFICE.

FRANK B. ALLEN, OF SALT LAKE CITY, UTAH.

TRANSMISSION-GEAR.

972,144.  Specification of Letters Patent.  Patented Oct. 11, 1910.

Application filed January 13, 1909. Serial No. 472,133.

*To all whom it may concern:*

Be it known that I, FRANK B. ALLEN, a citizen of the United States, residing at Salt Lake City, in the county of Salt Lake, State of Utah, have invented certain new and useful Improvements in Transmission-Gears, of which the following is a description, reference being had to the accompanying drawing and to the letters and figures of reference marked thereon.

My invention relates to new and useful improvements in transmission gears, and their operating mechanism, whereby motion is transmitted from one shaft to another.
An object of the invention is to provide a transmission gearing wherein a plurality of forward speeds may be secured when desired, the mechanism for shifting from one speed to another being simple in construction, and durable in operation.

A further object of the invention is to provide a transmission gearing having a plurality of different speeds with shifting mechanism which is so constructed and arranged that only one of the transmission gears may be thrown into operation at the same time.

Further objects of the invention will in part be obvious, and will in part be more fully hereinafter described.
In the drawings which show by way of illustration one embodiment of my invention; Figure 1 is a top plan view of a casing showing my improved mechanism carried thereby. Fig. 2 is a side view of the casing showing the supporting bracket and the operating levers for shifting from one speed to another. Fig. 3 is an end view of the parts shown in Fig. 1, as viewed from the right. Fig. 4 is a sectional view through the segment bar, and the latch releasing bar, showing the locking dog in end view. Fig. 5 is a detail showing the shape of the ends of the clutching dogs.

The casing 1 may be of any desired construction and is herein shown as a rectangular frame. Mounted in the casing 1 is a shaft 2, which is provided with a plurality of gears 3, 4, 5, 6, 7, and 8, each of which is keyed to the shaft 2, so as to rotate therewith. A shaft 9 is also mounted in the casing 1, and is located parallel with the shaft 2. The shaft 9 is provided with a gear 10, which meshes with the gear 8. The gear 10 is loosely mounted on the shaft 9, and is held from longitudinal movement by means of a collar 11 secured to the shaft 9. A gear 12 is on the shaft 9, and meshes with the gear 7. A gear 13 is also mounted on the shaft 9, and meshes with the gear 6. The collars 14 and 15 prevent the gears 12 and 13 from moving longitudinally on the shaft 9, but permit said gears to rotate independently of the shaft, and independently of each other. I have also provided shaft 9 with the gears 16 and 17, which mesh respectively with gears 5 and 4. The gears 16 and 17 turn freely on the shaft 9 and are held from longitudinal movement by the collars 18 and 19. A gear 20, is loosely mounted on the shaft 9, and held from longitudinal movement by the collar 21. Said gear 20, as shown in Fig. 3, meshes with a gear 22 supported by a depending bracket 23 formed in said casing 1. The gear 22 in turn meshes with the gear 3.
It will be noted that the gears 4 to 8 inclusive are successively larger in diameter and the corresponding gears with which said gears mesh are successively smaller in diameter. By this varying of the size of the intermeshing gears, I am able to transmit movement varying speeds from one shaft to another. The gears 3 and 20, owing to the intermediate gear 22, will impart a reverse movement from one shaft to another.
In applying my device, for use in connection with an automobile or the like, either the shaft 2 or the shaft 9 may be the driving shaft, and the other shaft of course, will be the driven shaft. I will however, hereinafter for the sake of clearness, refer to the shaft 2 as the driving shaft, and the shaft 9 as the driven shaft.

In order to secure the loose gears to the driven shaft, I have provided a plurality of clutch members 24, 25, and 26. The clutch member 24 consists of a collar which is splined to the driven shaft 9, and carries two oppositely disposed clutch dogs 27 and 28. The clutch dog 27 is provided with a tapered face forming a cam shoulder as clearly shown in Fig. 5. The gear 10 is provided with a similar clutch dog 29, having a cam face so disposed as to coöperate with the cam face on the clutch dog 27.
The collar 24 is provided with spaced circular ribs 30 and 31 between which freely rests a forked arm 32, carried by a sleeve 33 mounted rigidly on a rod 34. The rod 34 extends through the casing and at its outer end is freely connected with a lever 35. The lever 35 as shown in Fig. 3 is forked at its lower end and each member of the fork is provided with a slot 36. A collar 37 is located between the members of the fork and is rigidly secured to the rod 34 by means of bolts 38, 39, which extend through the slots 36.

The dog 28 carried by the collar 24 is adapted to coöperate with a similar dog 40 which is connected to the gear 12. It will readily be seen that if the rod 34 is shifted to the left, the clutch dog 27 will be brought into locking engagement with the clutch dog 29, which will secure the gear 10 to the driven shaft 9, and therefore the motion of the driving shaft 2, will be imparted through the gears 8 and 10 to the driven shaft 9. If the rod 34 is shifted to the right, then the gear 12 will be locked to the driven shaft 9 and the motion of the driving shaft 2 imparted through the gears 7 and 12 to the driven shaft 9. As a means for holding the clutch dogs 27 and 28 normally out of engagement with the dogs 29 and 40, I have provided a spring 41, which surrounds the bar 34, and at one end rests against the casing 1, while its other end bears against the collar 33, which is rigidly connected to the bar. I have also provided a spring 42 which surrounds the bar 34, bearing at one end against the collar 33, while at its other end, said spring bears against a bracket 43, rigidly secured to the casing 1, and through which the rod 34 freely slides.

The lever 35 is pivoted to a bracket 44 and carries a pivoted latch 45, which engages suitable notches in a segment bar, so that said lever may be locked in its neutral position, that is, with the dogs 27 and 28 out of engagement with the dogs 29 and 40. Said lever if swung in one direction about its pivot, will move the rod compressing the spring 41, so as to bring the clutches 27 and 29 into engagement. If the latch be released from its notch, the spring 41 will at once move the clutch collar to its central or neutral position. The spring 42 always acts to throw the clutch member to its neutral position. The member 25 carries clutch dogs 46, 47, which coöperate with clutch dogs 48, 49, carried respectively by the gears 13 and 16. The clutch member 25 is operated by a forked arm 50, of similar construction to the forked arm 32. The forked arm 50 is carried by a tube 51, which slides freely on the rod 34, and in the casing and is pivotally connected at its outer end to a lever 52, by a slot and bolt connection 53.

The lever 52 is located centrally of the bracket 44, and is provided with a locking dog 54. A spring 55 engages the bracket 43 at one end, and at its other end, rests against the arm 50 rigidly connected to the tube 51. A spring 56 bears against the bracket 43, at one end and at its other end against the arm 50. The springs 55 and 56 serve to hold the arm 50 in a neutral position. Said arm 50 together with the clutch carrying member 25, may be shifted either to the right or to the left by means of the operating lever 52. The clutch collar 26 carries clutching dogs 57, and 58, which coöperate respectively with clutch dogs 59 and 69 carried by the gears 17 and 20. A forked arm 61 coöperates with the clutch collar 26, in the same manner as the forked arm 22. The forked arm 61 is carried by a tube 62 which slides freely on the tube 51, and in the casing. Said tube 62 is connected to a lever 63 by a slot and bolt connection 64. The lever 63 is pivoted to the bracket 44 and is provided with a locking dog 64. The locking dog 64 is adapted to engage the notches 65, 66, and 67, formed in the segment bar 68, carried by the bracket 44. By shifting the lever 53 so that the locking dog 64 engages the various notches 65, 66, and 67, the clutch collar 66, may be shifted respectively into engagement with the clutch dog 59, in neutral position, or in engagement with the clutch dog 60. The springs 69 and 70 operate to hold the forked lever 61 in a neutral position.

In order to avoid throwing into connection two of the gears at the same time, I have provided each of the segment bars with a latch releasing bar 71. Said latch releasing bars are all similar in structure and are pivoted at one end to the bracket 44 by pivot pins 72. At the forward end, the latch releasing bars 71 are each connected to a cross bar 73, so that if one of said latch bars be swung about its pivot pin 72, the other one will also receive a similar movement.

The locking dog 64 as shown in Fig. 4, is provided at its forward end with a downwardly extending portion 74, and a laterally projecting portion 75, which extends underneath the latch releasing bar 71. Each of the locking dogs 64, 54, and 35, are similar in construction. It will readily be seen therefore, that if any one of the locking dogs be raised to lift the catch thereof out of the notch in the segment bar, said movement of the locking dog will lift all the latch releasing bars. Each of the latch releasing bars is provided with a notch or recess 76 so that if the locking dogs are in the central notch, that is, with the clutches each in neutral position, the movement of the latch releasing bars, caused by the movement of the locking dog, will have no effect upon the other locking dogs. If however, any one of the locking dogs should be in engagement with the outside notches so that one of the gears is locked to the driven shaft, then a movement of any one of the other locking dogs will through the raising of the latch releasing bars, lift the locking dog from the outside notch so that the springs operating upon the forked arms 32, 50, and 61, may return the corresponding clutch collar to neutral position. A spring 77 is provided for each one of the locking dogs, to hold the same in engagement with the notched segment bar.

Having thus particularly described my invention, what I claim as new and desire to secure by Letters Patent is:—

1. The combination of a driving shaft, a driven shaft, a plurality of pairs of intermeshing gears carried by said shafts, the gears on one of said shafts being loosely mounted thereon, and means for connecting any one of said loosely mounted gears to its supporting shaft, including a plurality of telescoping reciprocating members, and a lever for reciprocating independently any one of said members.

2. The combination of a driving shaft, a driven shaft, a plurality of pairs of intermeshing gears carried by said shafts, the gears on one of said shafts being loosely mounted thereon, and means for connecting any one of said loosely mounted gears to its supporting shaft, including a plurality of telescoping tubes and a lever for operating each of said tubes independently of the other.

3. The combination with a shaft, of a plurality of spaced gears loosely carried by said shaft, a plurality of clutching devices located intermediate said spaced gears, means for shifting said clutching devices including a plurality of telescoping tubes, and a lever for operating each of said tubes.

4. The combination with a shaft, of a plurality of spaced gears loosely carried by said shaft, a plurality of clutching devices located intermediate said spaced gears, means for shifting said clutching devices including a plurality of telescoping tubes, levers for shifting said tubes independent of each other, and springs operating to shift said tubes so that said clutch members are held in neutral position.

5. The combination of a shaft, a plurality of spaced gears loose on said shaft, a clutch intermediate each pair of gears, independent members for shifting said clutches, a lever for each of said independent members, a latch dog for locking each of said levers with a clutch in engagement with either of the gears, and means for releasing the latch dog of a lever so locked upon the lifting of any other of the latch dogs.

6. The combination of a shaft, a plurality of pairs of spaced gears loose on said shaft, clutch supporting collars splined to said shaft intermediate each pair of gears, a forked arm for shifting said clutch supporting collars, independent members for shifting said clutch collars, a lever for operating each of said independent members, and springs for holding said independent members with the clutch supporting collars in neutral position, a latch dog for locking each of said levers with the clutch collar in engagement with either of the gears, and means for releasing the latch dog of a lever so locked upon the lifting of any other of the latch dogs.

In testimony whereof I affix my signature, in presence of two witnesses.

FRANK B. ALLEN.

Witnesses:
   HENRY V. VAN PELT,
   GEO. F. GOODWIN.